United States Patent [19]

Fauconnier et al.

[11] Patent Number: 4,751,881

[45] Date of Patent: Jun. 21, 1988

[54] IGNITER CAPABLE OF BEING FITTED IN THE NOZZLE OF A PROPULSION UNIT

[75] Inventors: Alain Fauconnier, Vert-le-Petit; Philippe Jacquemin, Ballancourt; Georges Granier, Viry-Chatillon; Claude Grimelli, Alfortville, all of France

[73] Assignee: Societe Nationale des Poudres et Explosifs, Paris Cedex, France

[21] Appl. No.: 16,076

[22] Filed: Feb. 18, 1987

[30] Foreign Application Priority Data

Feb. 21, 1986 [FR] France ................................ 86 02378

[51] Int. Cl.[4] .............................................. F42C 19/08
[52] U.S. Cl. ...................................... 102/202; 60/256
[58] Field of Search .................. 102/202, 380; 60/256, 60/39.823

[56] References Cited

U.S. PATENT DOCUMENTS

| | | | |
|---|---|---|---|
| 2,720,749 | 10/1955 | Beebe, Jr. ............................ | 60/256 |
| 2,776,623 | 1/1957 | Bonner ................................ | 102/202 |
| 3,221,495 | 12/1965 | Tweet .................................. | 60/254 |
| 3,304,865 | 2/1967 | Gungle ............................ | 239/265.11 |
| 3,583,162 | 6/1971 | Neely ................................. | 60/255 |
| 3,910,191 | 10/1975 | Williams ............................. | 60/271 |
| 4,023,497 | 5/1977 | Morris et al. .................... | 102/380 |
| 4,170,941 | 10/1979 | Reichard et al. ................ | 102/202 |
| 4,232,843 | 11/1980 | Clark et al. ....................... | 60/256 |
| 4,573,316 | 3/1986 | Carrier et al. .................... | 102/380 |

FOREIGN PATENT DOCUMENTS

| | | |
|---|---|---|
| 118595 | 9/1984 | European Pat. Off. . |
| 2392240 | 10/1983 | France . |
| 31272 | 2/1952 | Luxembourg . |

*Primary Examiner*—Charles T. Jordan
*Attorney, Agent, or Firm*—Bucknam and Archer

[57] ABSTRACT

Pyrotechnic igniter capable of being fitted in, and withdrawn from the throat of the nozzle of a propulsion unit. The igniter comprises parts bearing on the convergent section (1a) and on the divergent section (1b) of the nozzle. In order to permit the fitting and the withdrawal of this igniter at any time, while improving the conditions of ignition of the propellent charge, the igniter comprises, on the one hand, an internal rupture member (2) and, on the other hand, external means of fitting (3) which are capable of expanding radially, this internal rupture member initially maintaining the external means of fitting in a deployed position.

9 Claims, 1 Drawing Sheet

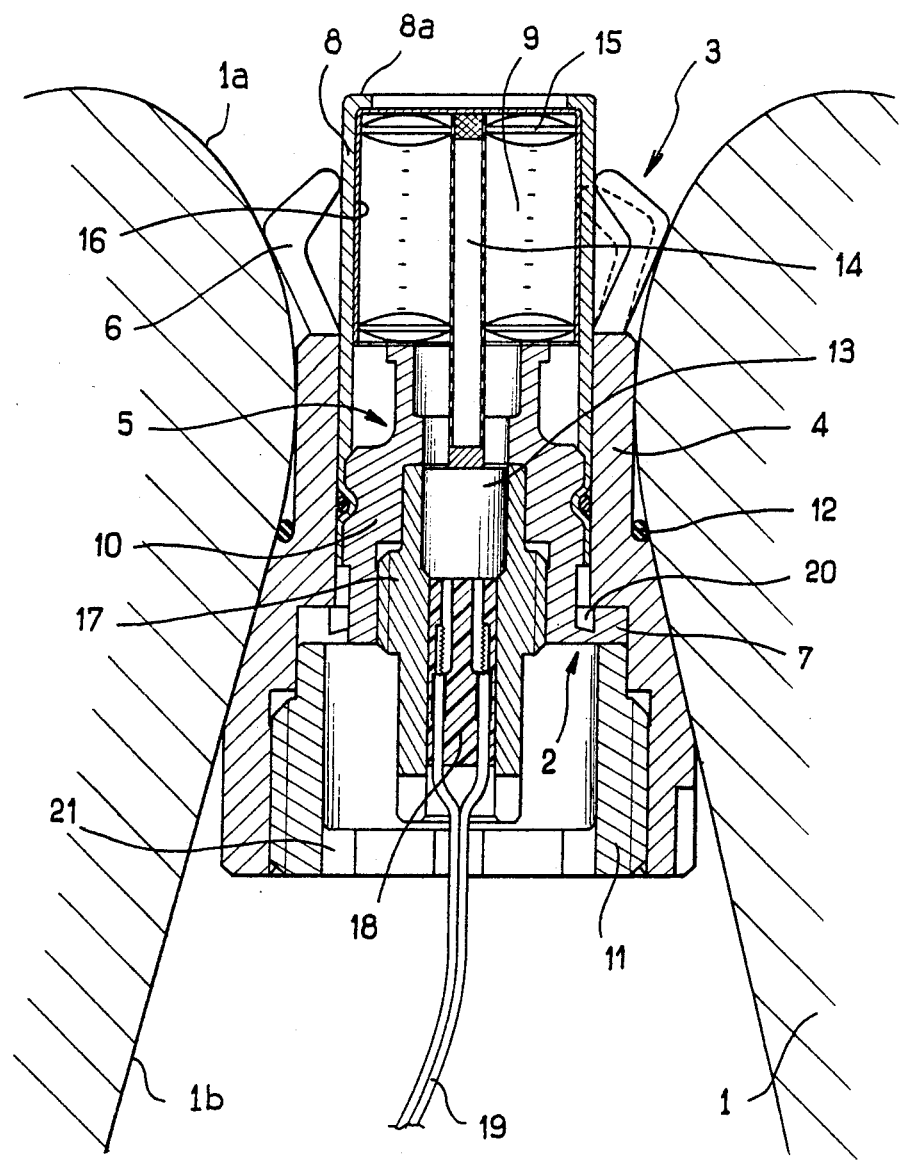

IGNITER CAPABLE OF BEING FITTED IN THE NOZZLE OF A PROPULSION UNIT

The invention relates to a pyrotechnic igniter capable of being fitted in, and capable of being withdrawn from the throat of the nozzle of a propulsion unit, where this propulsion unit contains, in particular, a charge of solid propellant. The fitting of this igniter is accomplished by means of a part which bears on the convergent section of the nozzle and of another part which bears on the divergent section of the nozzle.

Igniters which are capable of being fitted into the nozzles of propulsion units have been known for many years and, for example, U.S. Pat. Nos. 2,720,749 and 2,776,623 mentioned such igniters in about 1950.

According to U.S. Pat. No. 2,720,749, the igniter was screwed into the divergent section of the nozzle by means of a threaded ring which was initially connected to this divergent section by means of destructible fingers. While an igniter of this kind can be fitted into and can be withdrawn from the throat of the nozzle at any time, it must be noted, however, that an excessive screwing of the igniter onto the ring runs the risk of damaging the fingers through shear, and this would result in an excessively premature ejection of the igniter when the propellent charge is set alight. Furthermore, in any case, this ejection of the igniter at the time of ignition takes place only after the positioning fingers have ruptured, and a rupture of this kind does not permit the igniter to be ejected under specified and reproducible pressure conditions. This rupture, which is due to the conicity of the divergent section, also entails a disturbance of the gaseous jet because, after the rupture, the remainder of each finger forms a projection in the divergent section.

U.S. Pat. No. 2,776,623 refers to a completely different type of igniter whose body is made of plastic and which has a diameter which is much greater than the throat diameter of the nozzle. An igniter body of this kind must be destroyed and expelled via the nozzle after the propulsion unit has ignited, which produces a random disturbance at the beginning of the propulsion and, to overcome this disadvantage, improvements have been proposed, particularly in patents FR No. 2,392,240 and EP No. 0,118,595. According to these two more recent patents, after the ignition of the propellant charge, the expulsion of the igniter takes place under pressure conditions which are less variable and more reproducible than the conditions obtained when using earlier methods, as a result of the pattern of winglets bearing on the convergent section of the nozzle, but igniters of this kind can no longer be fitted into, and withdrawn from the throat of the nozzle at any time, particularly for the purpose of safety conditions and for interchangeability.

The purpose of the present invention is to make it possible to fit and to withdraw an igniter in the nozzle of a propulsion unit, while enabling this igniter to be expelled after the propellent charge has been set alight under well-specified and reproducible pressure conditions, and without disturbing the flow of the combustion gases.

The invention is characterized in that the igniter comprises, on the one hand, an internal rupture member and, on the other hand, external means of fitting which are capable of expanding radially, this internal rupture member initially holding in a deployed position the external means of fitting which bear on the convergent section of the nozzle.

More particularly, the external means of fitting of the igniter are arranged in a peripheral shell which is independent of the central body of the igniter, which makes it possible to deploy radially the external means of fitting by introducing the central body of the igniter into this peripheral shell, and which thus avoids the use of control rods or of any other intermediary device between the external means of fitting and the internal rupture member.

Advantageously, the peripheral shell comprises external means of fitting which consist of at least two flexing side claws bearing on the central body of the igniter, with a possibility of these flexing claws being replaced by independent side claws which are articulated on a pivot or which are wedge-shaped and slide radially. Towards their free ends, these side claws have an effective thickness which is greater than one half of the difference between the diameter of the throat of the nozzle and the diameter of the central body of the igniter.

According to a particular embodiment, the internal rupture member is a shear disc which forms a closure, it being possible for this disc to be perforated so as to provide only radial shear arms. This shear disc is initially fastened integrally to the central body of the igniter and to the peripheral shell, and, preferably, this disc and the central body are made as a single component by machining or by moulding.

The central body of the igniter advantageously consists of a case which contains the ignition charge and of a central carrier connected to the internal rupture member, it being possible for this carrier to comprise a peripheral rim which forms the shear disc integrally fastened to the peripheral shell by means of a threaded ring. At the end away from the shear disc, this threaded ring preferably comprises at least one internal abutment whose inner diameter is smaller than the shearing diameter of the disc.

The advantages obtained by virtue of this invention consist essentially in that the conditions of the ignition of the propellant charge are improved by the fact that the expulsion of the igniter takes place under specified and reproducible pressure conditions, and this makes it possible, in particular, to limit, or even to eliminate, the overpressures in the combustion chamber at the time when the propellant charge bursts into flame. During the ignition, in fact, the pressure rise gradient in a combustion chamber containing a solid propellant is of the order of 3 to 10 bars per millisecond and, under these conditions, any random delay in the opening of the nozzle can produce an initial overpressure which needs to be taken into account in the calculation of the strength of the body of the propulsion unit. The use of an internal rupture member forming an integral part of the igniter, especially of a shear disc which forms a closure, enables the internal pressure causing the rupture of this member to be determined with high accuracy, whereas the tearing of fingers or of arms can take place only within much wider margins of error. Furthermore, the expandable external means which ensure the fitting of the igniter in the convergent section of the nozzle are released under perfectly reproducible conditions under which the initial moment of this release corresponds to the moment of breaking of the rupture device, which forms an integral part of the igniter and which, according to the invention, initially maintains the external means of fitting in a deployed position.

In the following text, the invention is set out in greater detail with the aid of a drawing in which the single FIGURE represents a particular embodiment.

The FIGURE shows, in axial lengthwise section, the central part of the nozzle of a propulsion unit, which is equipped with an igniter according to the invention.

According to this FIGURE, the igniter, which initially forms a leakproof closure of the nozzle (1) for the ejection of gases from the propulsion unit, bears on the convergent section (1a) and on the divergent section (1b) of this nozzle. The peripheral shell (4) of this igniter comprises a conical portion, which has the same conicity as the divergent section of the nozzle, which is in contact with this divergent section, and which is extended by a cylindrical portion which has a diameter slightly smaller than the diameter of the throat of the nozzle and which is engaged in this throat. The transition between these conical and cylindrical portions of the peripheral shell forms a supporting base for an O-ring seal (12) and, away from the conical portion, this shell is extended by four flexing side claws (6) which form the external means of fitting (3) and are capable of expanding radially to bear on the convergent section (1a) of the nozzle. The peripheral shell assembly (4) is made of a material permitting the side claws (6) to flex, particularly a plastic such as polycarbonate, and these claws are moulded in a middle position which is shown by broken lines in the right-hand half of the FIGURE, the maximum external diameter of these claws in the moulding position being greater than the diameter of the throat of the nozzle, and the minimum internal diameter of these claws in the moulding position being smaller than the internal diameter of the peripheral shell (4).

When the igniter is mounted in the propulsion unit's gas-ejection nozzle (1), the peripheral shell (4) is first introduced by itself into the throat of the nozzle simply by pushing from the divergent section, this push producing the inward flexure of the four side claws (6), which, being elastic, regain their moulding position and ensure that this shell is temporarily held until the central body (5) of the igniter is slid into this shell. This central body consists of the cylindrical case (8) which contains the ignition charge (9) and of the central carrier (10) of the igniter, onto which this case is crimped. The placing of the central body (5) in the peripheral shell (4) produces the outward flexure of the four side claws (6) which are pushed into contact with the convergent section (1a) of the nozzle and ensure that the igniter is fixed in this nozzle after a deformation of the O-ring seal (12).

The central carrier (10) contains the flame initiator (13) which is reinforced by an ignition powder and which ensures the support of a flame tube (14) around which are arranged the aluminothermic ignition pellets (15) contained in the casing (16). This flame initiator is integrally fastened to the flame-initiator-carrier (17) by means of a hot-melt sealant adhesive (18) in which the electrical ignition leads (19) are embedded. This central carrier (10) comprises a peripheral rim (7) which forms a partial shear disc, with twelve radial slots defining twelve arms in the shape of crown ring segments whose rupture zone is determined by the outer cylindrical surface of the groove (20), whose diameter is slightly greater than the external diameter of the case (8). The central body (5) of the igniter is integrally fastened to the peripheral shell (4) by means of the threaded ring (11) which locks the ends of the arms of the shear disc on a sill provided in the bore of shell. The internal diameter of this externally threaded ring is greater than the diameter of the rupture zone of the arms of the shear disc, with the exception of the rear portion of this ring (11), which comprises four inner bosses (21) enabling this ring to be screwed and forming a rear abutment for the central body (5) after the arms of the periperhal rim (7) have sheared.

The withdrawal of the igniter from the throat of the nozzle is carried out by reversing the order of the mounting operations. After the threaded ring (11) has been unscrewed, the central body (5) of the igniter can be withdrawn, with the flexing side claws (6) regaining, owing to elasticity, their moulding positions which are shown by broken lines in the FIGURE. If need be, the peripheral shell (4) can then be extracted by a backward pull which causes the inward flexing of the side claws until the latter reach the throat of the nozzle. The complete withdrawal of the igniter from the throat of the nozzle is thus performed in two parts, whereas the ejection of this igniter after the propellent charge has been ignited takes place as a single unit. In fact, when the internal pressure prevailing in the combustion chamber of the propulsion unit produces a thrust force on the central body (5) of the igniter which is equal to the shearing force of the disc (7), the latter ruptures and the central body is projected towards the rear. As soon as the front face (8a) of the case reaches the region of contact with the flexing side claws, the latter are projected towards the middle and the pressure in the combustion chamber then also ejects the peripheral shell (4) and the threaded ring (11) whose inner bosses (21) are struck by the central body (5), the igniter being then ejected as a single unit and immediately clearing the entire flow cross-section of the throat of the nozzle (1).

We claim:

1. In a propulsion unit which comprises a gas ejection nozzle, (1) a propellant charge, an ignition charge (9) and an igniter, said nozzle having a convergent section (1a) and a divergent section (1b), which form a throat, said igniter comprising a peripheral shell (4), a central body (5) positioned within said shell and containing said ignition charge, a shear disc (7) forming a closure and parts bearing on the convergent section (1a) and on the divergent section (1b) of the nozzle, wherein said parts bearing on the convergent section (1a) consist of external means of fitting (3) which are capable of expanding radially and which are initially held in a deployed position by said shear disc (7).

2. The igniter according to claim 1 wherein said external means for fitting (3) are arranged in said peripheral shell (4) and said shell is independent of the central body (5) of the igniter.

3. The igniter according to claim 2 wherein said external means of fitting consist of at least two flexing side claws (6) bearing on said central body (5) of the igniter.

4. The igniter according to claim 3 wherein said peripheral shell 4 is made of a material permitting said side claws (6) to flex, said claws being molded in a middle position, the maximum external diameter of said claws (6) in the molding position is greater than the diameter of the throat of the nozzle, and the minimum internal diameter of said claws (6) in the molding position is smaller than the internal diameter of said peripheral shell (4).

5. The igniter according to claim 4 wherein said shear disc (7) is initially fastened integrally to said central body (5) of the igniter and to the peripheral shell (4).

6. The igniter according to claim 2 wherein the central body (5) of the igniter consists of a case (8) which contains said ignition charge (9) and of a central carrier (10) connected to said shear disc (7).

7. The igniter according to claim 6 wherein said central carrier (10) comprises a peripheral rim which forms said shear disc (7).

8. The igniter according to claim 7 wherein said shear disc (7) is integrally fastened to said peripheral shell (4) by means of a threaded ring (11).

9. The igniter according to claim 8 wherein said threaded ring has an end, and at said end away from the shear disc, the threaded ring comprises at least one internal abutment, the inner diameter thereof being smaller than the shearing diameter of the disc (7).

* * * * *